United States Patent
Ramsey et al.

(10) Patent No.: US 9,829,913 B2
(45) Date of Patent: Nov. 28, 2017

(54) SYSTEM AND METHOD OF REALIGNMENT OF READ DATA BY SPI CONTROLLER

(71) Applicant: Goodrich Corporation, Charlotte, NC (US)

(72) Inventors: Scott W. Ramsey, Northbridge, MA (US); Jonathan C. Jarok, Chelmsford, MA (US)

(73) Assignee: Goodrich Corporation, Charlotte, NC (US)

( * ) Notice: Subject to any disclaimer, the term of this patent is extended or adjusted under 35 U.S.C. 154(b) by 59 days.

(21) Appl. No.: 14/728,451

(22) Filed: Jun. 2, 2015

(65) Prior Publication Data

US 2016/0357217 A1    Dec. 8, 2016

(51) Int. Cl.
  G06F 1/12        (2006.01)
  G06F 13/42       (2006.01)

(52) U.S. Cl.
  CPC ............ *G06F 1/12* (2013.01); *G06F 13/4282* (2013.01); *G06F 13/4291* (2013.01)

(58) Field of Classification Search
  CPC .............................. G06F 1/12; G06F 13/4282
  See application file for complete search history.

(56) References Cited

U.S. PATENT DOCUMENTS

| | | | |
|---|---|---|---|
| 5,560,000 A * | 9/1996 | Vogley | G06F 1/10 711/167 |
| 5,627,716 A | 5/1997 | Lagree et al. | |
| 6,424,198 B1 | 7/2002 | Wolford | |
| 6,600,681 B1 * | 7/2003 | Korger | G11C 7/1066 365/193 |
| 2004/0174831 A1 * | 9/2004 | Yi | H04L 29/06 370/278 |
| 2005/0212565 A1 | 9/2005 | Bogdan | |
| 2007/0217559 A1 * | 9/2007 | Stott | G11C 7/1051 375/355 |
| 2008/0112255 A1 * | 5/2008 | Nygren | G11C 29/50012 365/230.08 |
| 2010/0135100 A1 * | 6/2010 | Chiu | G11C 7/1072 365/233.11 |
| 2010/0195421 A1 * | 8/2010 | Jeddeloh | G11C 5/02 365/193 |
| 2010/0211728 A1 | 8/2010 | Naujokat | |
| 2011/0063931 A1 * | 3/2011 | Linam | G06F 13/1689 365/193 |

(Continued)

FOREIGN PATENT DOCUMENTS

EP    2778943 A1    9/2014

OTHER PUBLICATIONS

Extended European Search Report for European Patent Application No. 16172711.0, dated Oct. 27, 2016.

*Primary Examiner* — Thomas Lee
*Assistant Examiner* — Chad Erdman
(74) *Attorney, Agent, or Firm* — Locke Lord LLP; Scott D. Wofsy; Joshua L. Jones

(57) ABSTRACT

A Serial Peripheral Interface (SPI) controller is provided for use within a computer system. The SPI controller includes a clock that generates system clock signals that synchronize a data transfer operation, and a dynamic clock delay element that phase shifts the clock signals with a delay offset and outputs read data that was received during a read operation from an SPI slave device with the clock signals that were phase shifted.

15 Claims, 3 Drawing Sheets

(56) References Cited

U.S. PATENT DOCUMENTS

| | | |
|---|---|---|
| 2012/0072628 A1 | 3/2012 | Crockett et al. |
| 2012/0311371 A1* | 12/2012 | Shaeffer .............. G06F 13/1694 713/501 |
| 2013/0124946 A1 | 5/2013 | Pekny et al. |
| 2014/0195728 A1* | 7/2014 | Hsu ..................... G06F 12/0246 711/105 |
| 2014/0210668 A1 | 7/2014 | Wang et al. |
| 2015/0318049 A1* | 11/2015 | Behl ...................... G11C 7/222 711/103 |
| 2016/0225454 A1* | 8/2016 | Kim ....................... G11C 16/10 |

\* cited by examiner

SYSTEM AND METHOD OF REALIGNMENT OF READ DATA BY SPI CONTROLLER

FIELD OF THE INVENTION

The present disclosure relates to internal computer-system communications between processing elements and peripheral devices, and more particularly, to using a Serial Peripheral Interface (SPI) management system to manage the same.

BACKGROUND OF THE INVENTION

The SPI protocol is a widely used protocol for data transfer between integrated circuits (ICs), in particular, between a single master device and one or more slave devices, e.g., peripheral devices. The SPI protocol is a source-synchronous protocol which requires a defined timing for correct operation. In a source-synchronous system there is a single clock domain, defined by the master device. The master device transmits a clock and a data signal to the slave device, if the slave device is responding to a read request, it must transfer the data back to the master device in alignment with the clock. The SPI protocol defines these alignment relationships.

The physical distance between the master device and the different slave device can vary. Furthermore, some slave devices may be configured to be electrically isolated from other devices, e.g., using electrical devices and/or multiple pounding planes. These variations in distance and electrical isolation can cause electrical delays in transmission of signals between the master device and the different slave devices. The delays may result in mis-alignment of data and/or incorrect data transfer, particularly with respect to READ operations.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect a Serial Peripheral Interface (SPI) controller for use within a computer system is disclosed. The SPI controller includes a clock that generates system clock signals that synchronize a data transfer operation, and a dynamic clock delay element that phase shifts the clock signals with a delay offset and outputs read data that was received during a read operation from an SPI slave device with the clock signals that were phase shifted.

In embodiments, the delay can be tuned based on a condition. The dynamic clock delay element can receive read data from a plurality of SPI slave devices during a plurality of read operations, and the condition associated with reading can include an identification of the slave device from which the read data is received during the read operation. The condition can be an environmental condition. The SPI controller can further include a calibration controller that can measure a delay associated with reading data from the slave device and can determine the phase offset for the slave device based on the delay measured.

In further embodiments, the SPI controller can be coupled to a plurality of SPI slave devices, wherein the SPI controller can further include a data structure that stores an index identifying the respective SPI slave devices and a delay offset associated with each index that is configured for the associated SPI slave device. The SPI controller can further include a calibration controller that can calibrate the SPI controller by determining a delay associated with the slave device when the slave device transmits a known pattern of read data to the SPI controller, and the calibration controller can assign a delay offset for the slave device based on the delay determined. The calibration controller can calibrate the SPI controller while the master SPI device controller and slave SPI devices are communicating by exchanging data transmission.

In accordance with another aspect of the disclosure, a method for reading data utilizing an SPI management system is disclosed. The method includes generating system clock signals that synchronize a data transfer operation, phase shifting the clock signals with a delay offset, and outputting read data that was received during a read operation from an SPI slave device with the clock signals that were phase shifted.

In embodiments, the method can further include tuning the delay based on a condition. The method can further include receiving read data from a plurality of SPI slave devices during a plurality of read operations, wherein the condition associated with reading can be an identification of the slave device from which the read data is received during the read operation. The condition can be an environmental condition.

In embodiments, the method can further include measuring a delay associated with read data that was read from the slave device; and determining the phase offset for the slave device based on the delay measured. The method can further comprise coupling the SPI controller to a plurality of SPI slave devices, storing indexes that identify the respective SPI slave devices, and storing a delay offset associated with each index, the delay offset being configured for the associated SPI slave device.

In an embodiment, the method can include calibrating the SPI controller, including, determining a delay associated with the slave device when the slave device transmits a known pattern of read data to the SPI controller, and assigning a delay offset for the slave device based on the delay determined.

BRIEF DESCRIPTION OF THE DRAWINGS

So that those having ordinary skill in the art, to which the present disclosure pertains, will more readily understand how to employ the novel system and methods of the present certain illustrated embodiments, the embodiments thereof will be described in detail herein-below with reference to the drawings, wherein.

DETAILED DESCRIPTION OF CERTAIN EMBODIMENTS

Figure 1:
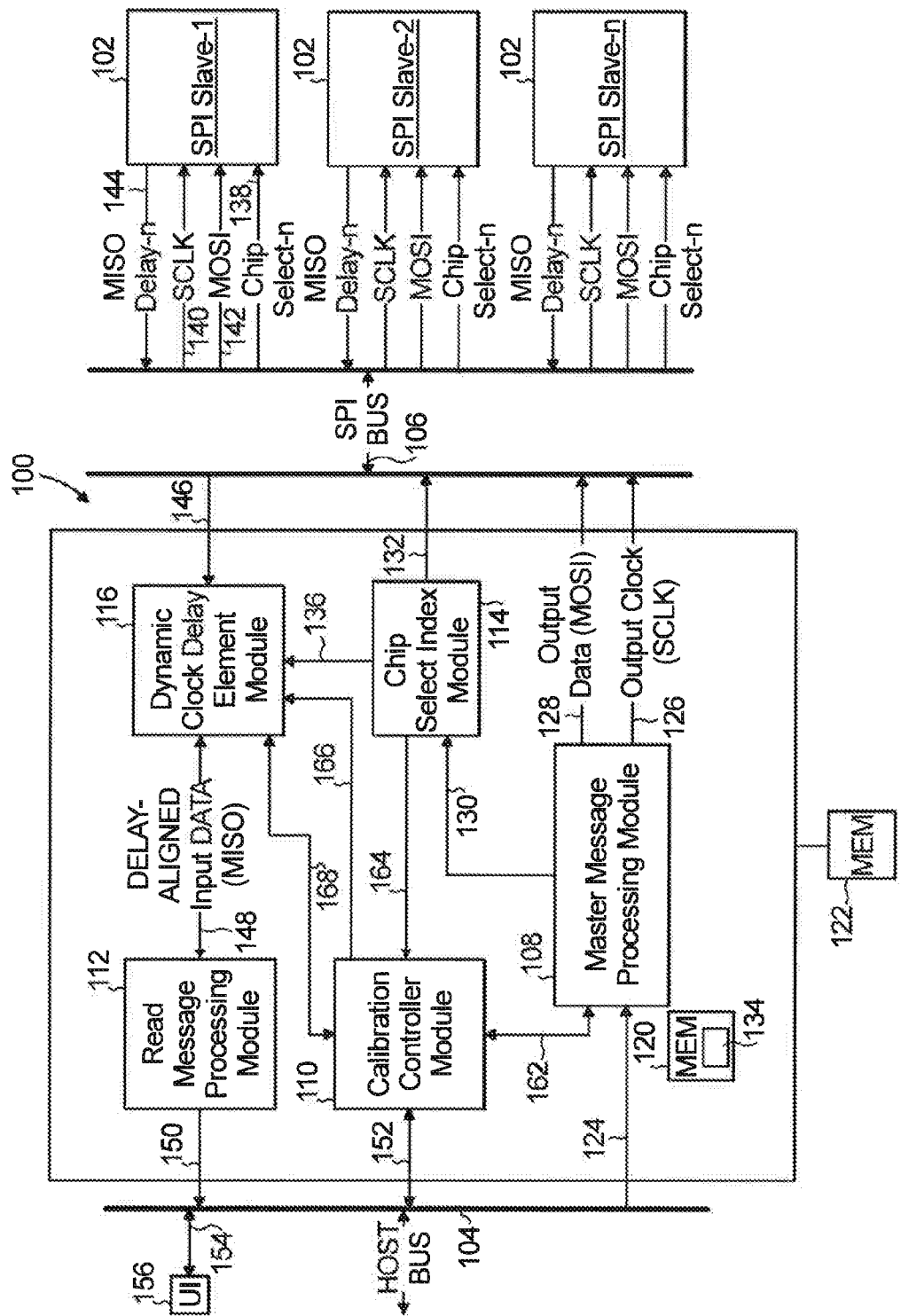
FIG. 1 illustrates a system diagram of an embodiment of an SPI management system configured to manage SPI-enabled devices.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to relating to below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli (and equivalents known to those skilled in the art) and reference to "the signal" includes reference to one or more signals (and equivalents thereof known to those skilled in the art), and so forth.

It is to be appreciated that certain embodiments described herein can be utilized in conjunction with a software algorithm, program, or code residing on a computer useable medium having control logic for enabling execution on a machine having a computer processor. As used herein, the term "software" is meant to be synonymous with any code or program that can be executed a processor e.g., of a host computing device, regardless of whether the implementation is in hardware, firmware or as a software computer product available on a disc, a memory storage device, for download from a remote machine, etc. One skilled in the art will appreciate further features and advantages of the certain embodiments described herein, thus the certain illustrated embodiments are not to be understood to be limited by what has been particularly shown and described, except as indicated by the appended claims.

As will be appreciated from the below description of certain illustrated embodiments, the methods described herein off-load work from a computer processor by functioning as an intermediary, managing communication to and from devices in a computer system and/or in a computing environment.

Turning now descriptively to the drawings, in which similar reference characters denote similar elements throughout the several views, FIG. 1 depicts an exemplary SPI controller 100, configured to manage communication between the SPI controller 100 (which is an SPI master device and at least one SPI slave device 102 (shown with n SPI slave devices). The SPI controller 100 can be coupled to a host computing device via a host bus 104, and the SPI slave devices 102 can be coupled to the SPI controller via an SPI bus 106. As used herein, the terms "host computing device," "slave device," "device," and/or "peripheral device" are meant to be broadly construed to include any type of physical entity that the SPI controller 100 is coupled to. In general, peripheral devices using SPIs may include, but are not limited to, various types of sensors (temperature, pressure, etc.) with analog or digital outputs, motor controllers, signal mixers, encoders, potentiometers, power transistors, LCD controllers, accelerometers, CAN controllers, USB controllers, amplifiers, and memory devices, and for chip to chip communications.

The SPI controller 100 includes a master message processing module 108, a read calibration controller module 110, a Read message processing module 112, a chip select index module 114, and a dynamic clock delay element 116.

It is to be appreciated that in the illustrated embodiments discussed below, the master message processing module 108, read calibration controller module 110, message processing module 112, and chip select index module 114 can be implemented as hardware, firmware, software, or a combination thereof. For example, one or more components of the SPI controller 100 can be implemented using an application specific programmable logic device, such as a field programmable gate array (FPGA), an application-specific integrated circuit (ASIC), a configurable logic block, a microcontroller, a digital signal processor, or the like. The embodiments that use hardware and/or firmware (such as an FPGA or ASIC) can use a hardware description language, such as Very High Speed Integrated Circuit (VHSIC) Hardware Description Language (VHDL) or Verilog. In embodiments that use a microcontroller, the microcontroller can execute software algorithms, software programs, or code residing on a computer useable medium.

The SPI controller 100 controls synchronous serial communication with the SPI slave devices 102 so that the SPI controller 100 and electronic devices (not shown) associated with the SPI controller can communicate in a spatially and electronically distributed system with the SPI slave devices 102.

The SPI controller 100 may be associated with or implemented in a host computing device (not shown), such as a fixed or mobile device, which can be any one or combination of a consumer electronic, communication, navigation, media, computing device, and/or other type of electronic device. The SPI controller 100 can be integrated with the host computing device by host bus 104, electronic circuitry, input-output (I/O) logic control, communication interfaces and components, as well as other hardware, firmware, and/or software. The slave devices 102 can be implemented in the host computing device or as peripheral devices to the host computing device.

The SPI controller 100 can include an internal memory 120 and external memory 122 The internal memory 120 and external memory 122 can include any form of data or information storage means, for example, volatile or non-volatile memory, solid state storage devices, magnetic devices, etc.

During an example read operation, the host computing device can transmit a read request for data from an SPI slave device 102 by transmitting the read request via host bus 104. The read request is transmitted from the host bus 104 to the master message processing module 108 via signal line 124. The read request includes a chip select index that identifies the SPI slave device from which the data is being requested, and a description of the data requested.

The master message processing module 108 responds to the read request by requesting the data from the appropriate SPI slave device 102, following SPI protocol, by sending to the SPI bus 106 a SCLK (serial clock) via signal line 126 and Output Data (master-out slave-in (MOSI)) via signal line 128 that includes the description of the data requested. The master message processing module 108 further sends the chip select index via signal line 130 to the chip select index module 114. The chip select module 114 sends the index via signal line 132 to the SPI bus 106. In the example shown, only the SPI slave device-1 102 that has a chip select line 138 that is configured to correspond to the chip select index is selected to process the read request in the MOSI data. In addition, the chip select index module 114 transmits the retrieved phase offset value via signal line 136 to the dynamic clock delay element 116.

The SPI slave devices 102 receive the SCLK, and MOSI signals via respective signal lines 140 and 142. Only the SPI slave device 102 selected by the chip select index processes the MOSI data and responds by transmitting the requested data (master-in slave out (MISO)) via signal line 144 to the SPI bus 106. The MISO data is transmitted one bit per clock edge of the SCLK signal. The MISO is transmitted with an inherent delay. The delay can be caused, for example, by the length of signal lines 138-144, environmental conditions (e.g., temperature), electrical isolation, e.g., across multiple ground planes.

While the delay can be estimated, the actual delay is unknown, unless it is measured. Additionally, the delay can change, such as due to changes to elements that form the SPI bus 106, for example a change to the length of one of signal lines 138-144 or the addition of circuitry. If the delay is not compensated for before providing the requested MISO data to the host bus 104, the data can become misaligned relative to SCLK, causing possible data corruption, in accordance with the disclosure, the delay is compensated for by the dynamic clock delay element 116. The chip select index module 114 accesses a data structure 134 using the index to retrieve a phase offset value that is stored in the data structure 134 in association with the index. The data structure 134 can be a look-up-table or the like that stores a predefined phase offset value in association with each respective index that identifies the SPI slave devices 1-n. The data structure 134 can be stored in internal memory 120 or external memo 122.

The dynamic clock delay element 116 receives the MISO data via signal line 146. The dynamic clock delay element 116 further applies the phase offset value received via signal line 136 to the MISO data to realign the MISO data. The realigned MISO data is transmitted via signal line 148 by the dynamic clock delay element 116 to the read message processing module 112. The read message processing module 112 transmits the realigned MISO data to the host bus 104, providing the response to the read request.

The dynamic clock delay element 116 can be implemented using a plurality of delay taps. The delay taps and logic for selecting the delay taps can be implemented by one or more of hardware, firmware, or software. If the phase offset value indicates that realignment should be performed, one or more delay taps are selected based on the phase offset value to provide an appropriate phase offset to realign the MISO data.

Figure 2:
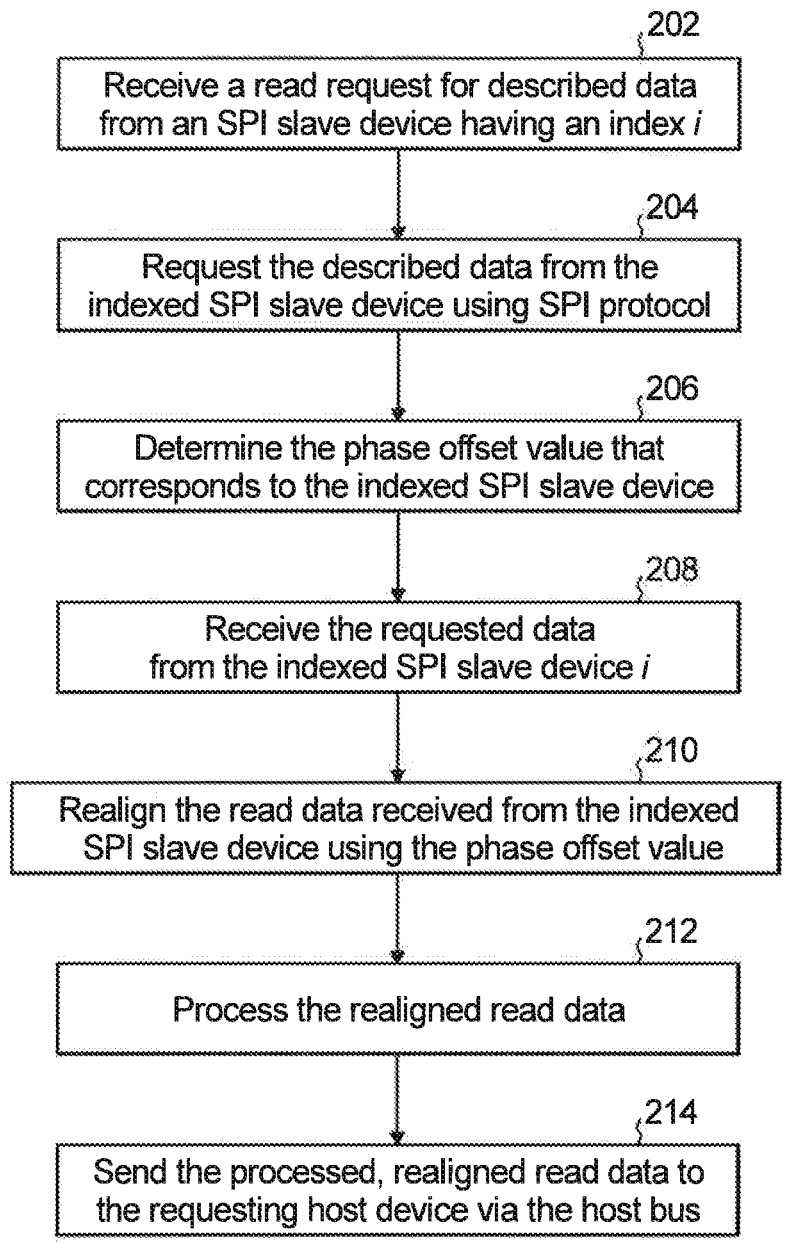
FIG. 2 is a flowchart of operations performed during an exemplary data transfer operation between SPI enabled devices using an SPI management system, in accordance with an embodiment of the present disclosure.
Figure 3:
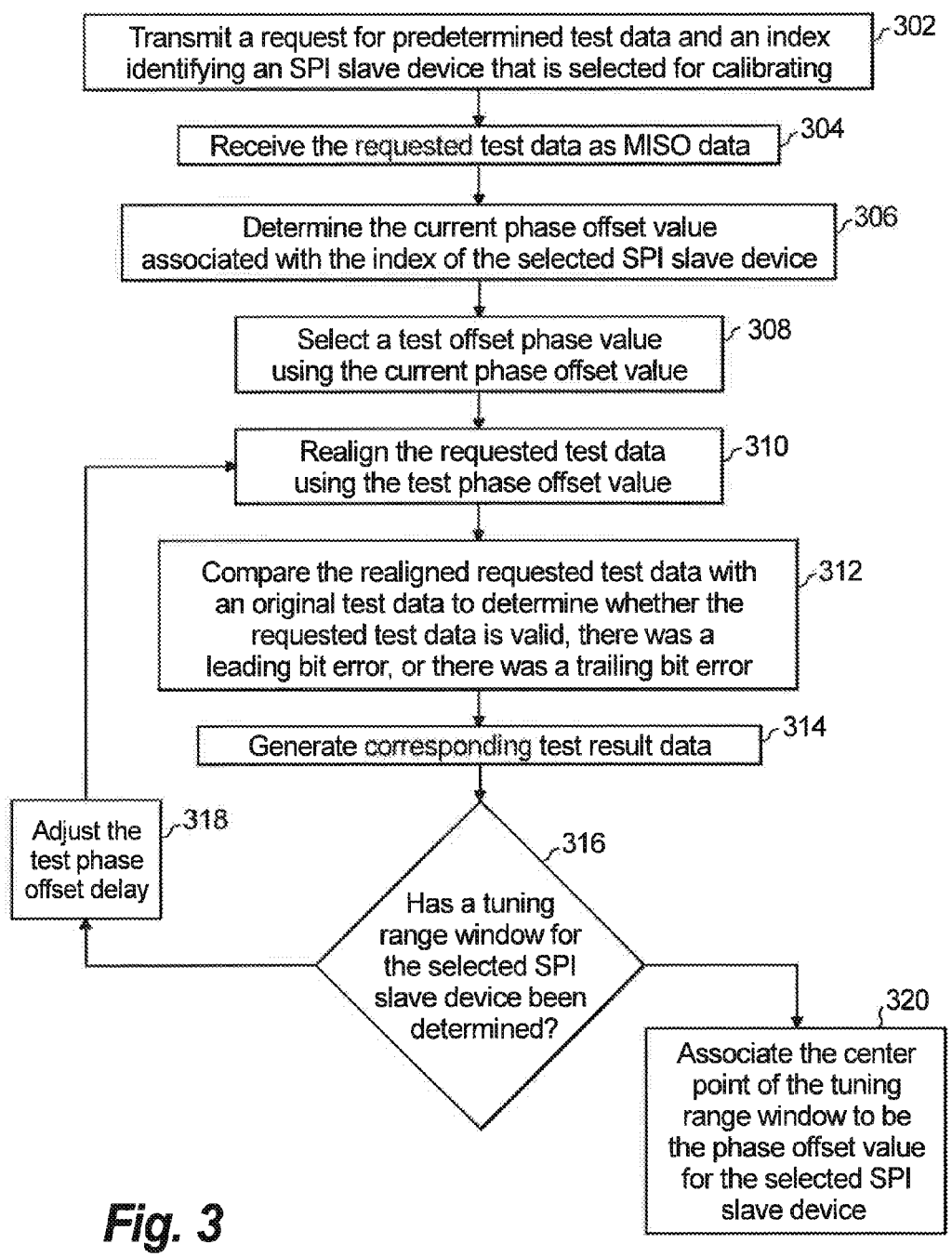
FIG. 3 is a flowchart of operations of calibrating phase offsets used by the SPI management system, in accordance with an embodiment of the present disclosure.

With reference now to FIGS. 2 and 3, shown is a flowchart demonstrating implementation of the various exemplary embodiments. It is noted that the order of steps shown in FIGS. 2 and 3 is not required, so in principle, the various steps may be performed out of the illustrated order. Also certain steps may be skipped, different steps may be added or substituted, or selected steps or groups of steps may be performed in a separate application following the embodiments described herein.

FIG. 2 is a flowchart showing the operations performed during a read operation. At operation 202, a read request is received for described data from an SPI slave device 102 having an index i. At operation 204, the data is requested from the indexed SPI slave device 102 using SPI protocol. At operation 206, the phase offset value that corresponds to the indexed SPI slave device 102 is determined. At operation 208, the requested data is received from the indexed SPI slave device 102. At operation 210, the read data received from the indexed SPI slave device 102 is realigned using the phase offset value. At operation 212, the realigned read data is processed. At operation 214, the processed, realigned read data is sent to the requesting host computing device via the host bus 104.

The SPI controller 100 can be calibrated to reduce or eliminate leading bit errors and/or trailing hit errors, and to increase the amount of valid read data that is transmitted to the host bus 104. A tuning window of phase delay values can be defined by a range that will achieve realignment so that the read data is valid defines a tuning window. The center point of the tuning window can be an optimum sampling point for performing calibration.

The calibration controller module 110 can begin a calibration operation upon the occurrence of an event or satisfaction of a condition, such as at regular time intervals, upon request from the host computing device, in response to a sensor outputting a value that exceeds a threshold value, or upon occurrence of an error condition, such as during processing of the realigned MISO data by the read message processing module 112. A calibration operation can be configured to calibrate the phase offset value associated with a selected one or more of the SPI slave devices 102, or to calibrate all of the SPI slave devices 102.

The calibration controller module 110 can be included with the SPI controller 100 or can be external to the SPI controller 100 and included with the host computing device. A user interface module 156 can be provided that permits a user to interact with the calibration controller module 110, such as to initiate a calibration operation and to select which SPI slave devices 102 to calibrate during a calibration operation. The user interface module 156 can communicate with the calibration controller module 110 via signal lines 152 and 154. The user interface module 156 can be executable by a processor of the host computing device or SPI controller 100. During the calibration operation, the calibration controller module 110 transmits a request for predetermined test data and an index to the master message processing module 108 via signal line 162 for a selected SPI slave device 102 that is to be calibrated during a first iteration. The calibration controller module 110 stores original test data that includes the same test pattern used in the predetermined test data requested. Additional iterations will be performed for each SPI slave device 102 that is intended to be calibrated during the calibration operation.

When the master message processing module 108 receives the request for test data and index, the master message processing module 108 proceeds in a similar fashion to a read operation and transmits the request for test data as MOSI data and SCLK to the SPI bus 106. Additionally, the master message processing module 108 sends the index to the chip select index module 114. The chip select index module 114 then transmits the index to the SPI bus 106. The selected SPI slave device 102 receives the index, SCLK, and request for test data (MOSI signals) and responds by transmitting the requested test data as MISO data via signal line 144 to the SPI bus 106.

The chip select index 114 consults the data structure 134 to determine the current phase offset value associated with the index and transmits the current phase offset value to the calibration controller module 110 via signal line 164. The calibration controller module 110 uses the current phase offset value to select a test offset phase value and provides the test offset phase value to the dynamic clock delay element 116 via signal line 166.

The dynamic clock delay element 116 receives the requested test data via signal line 146. The dynamic clock delay element 116 uses the test phase offset value from the calibration controller module 110 to realign the MISO data. The realigned test data is transmitted via signal line 168 by the dynamic clock delay element 116 to the calibration controller module 110. The calibration controller module 110 compares the realigned MISO data with the original test data and determines whether the realigned test data is valid, there was a leading bit error, or there was a trailing bit error and generates corresponding test result data. The comparison can be performed serially or in parallel.

The calibration controller module 110 uses the test result data to iteratively continue calibrating the selected SPI slave device 102 by requesting test data from the selected SPI slave device 102 using different test phase offset values. The calibration controller module 110 determines a range of test phase offset values that define a tuning range window for the selected SPI slave device 102. The tuning range window includes test phase offset values that cause the realigned MISO data to be valid data, and which are bounded by the test phase offset values that cause occurrences of leading bit errors and trailing bit errors. The calibration controller module 110 selects the center point of the tuning range window to be stored in the data structure 134 as the phase offset value associated with the selected SPI slave device 102.

FIG. 3 is a flowchart showing the operations performed during a calibration operation of a selected SPI slave device 102. At operations 302, a request for predetermined test data and an index identifying an SPI slave device 102 that is selected for calibrating is transmitted to the selected SPI slave device 102. At operation 304, the requested test data is received as MISO data from the selected SPI device.

At operation 306, the current phase offset value associated with the index of the selected SPI slave device is determined. At operation 308, a test offset phase value is selected using the current phase offset value. At operation 310, the requested test data is realigned using the test phase offset value from the calibration controller module 110. At operation 312, the realigned requested test data is compared with original test data that corresponds to the predetermined test data to determine whether the requested test data is valid, or there was a leading bit error, or there was a trailing bit error. At operation 314, test result data corresponding to the determination of validity/error is generated. At operation 316, a determination is made whether a tuning range window for the selected SPI slave device 102 has been determined, wherein the tuning range window is defined by test phase offset values that cause the realigned test data to be valid data, and which are bounded by the test phase offset values that cause occurrences of leading hit errors and trailing bit errors. If the tuning range window is not determined at operation 316, the method continues at operation 318. At operation 318, the calibration controller module 110 adjusts the test phase offset delay and the method returns to operation 312. If the tuning range window is determined at operation 316, the method continues at operation 320. At operation 320, the center point of the tuning range window is selected and stored as the phase offset value associated with the selected SPI slave device.

In summary, advantages of some of the embodiments illustrated herein include that multiple SPI slave devices can be associated with different respective phase offset values. In addition, the phase offset values can be calibrated while the SPI master device (e.g., SPI controller) and SPI slave device are coupled to one another for exchanging messages and even while such messages are being exchanged, e.g., in between messaging processing functions. Furthermore, the phase offset value can be calibrated during operation of the SPI master and slave devices, including in real time, in response to conditions such as a sensed change, e.g., a change in temperature, a change in SPI mode, or surpassing a threshold level of allowed read errors. This approach, advantageously, obviates tedious and time consuming manual calibration while effectively and efficiently improving computer-system communications performance between master and slave devices.

The techniques described herein are exemplary, and should not be construed as implying any particular limitation of the certain illustrated embodiments. It should be understood that various alternatives, combinations, and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A Serial Peripheral Interface (SPI) controller for use within a computer system, the SPI controller comprising:
   a clock that generates system clock signals that synchronize a data transfer operation;
   a dynamic clock delay element that phase shifts the clock signals with a delay offset and outputs read data that was received during a read operation from an SPI slave device with the clock signals that were phase shifted; and
   a calibration controller that calibrates the SPI controller by determining a delay associated with the slave device when the slave device transmits a known pattern of read data to the SPI controller, wherein the calibration controller assigns the delay offset for the slave device based on the delay determined.

2. The SPI controller according to claim 1, wherein the delay is tuned based on a condition.

3. The SPI controller according to claim 1, wherein the dynamic clock delay element receives read data from a plurality of SPI slave devices during a plurality of read operations, and the condition associated with reading is an identification of the slave device from which the read data is received during the read operation.

4. The SPI controller according to claim 1, wherein the condition is an environmental condition.

5. The SPI controller according to claim 1, further comprising a calibration controller that measures a delay associated with reading data from the slave device and determines the phase offset for the slave device based on the delay measured.

6. The SPI controller according to claim 1, wherein the SPI controller is coupled to a plurality of SPI slave devices, the SPI controller further comprising a data structure that stores an index identifying the respective SPI slave devices and a delay offset associated with each index that is configured for the associated SPI slave device.

7. The SPI controller according to claim 1, wherein the calibration controller calibrates the SPI controller while the SPI controller and slave SPI devices are communicating by exchanging data transmission.

8. A method for reading data utilizing a Serial Peripheral Interface (SPI) management system, the method comprising:
generating system clock signals that synchronize a data transfer operation;
phase shifting the clock signals with a delay offset; and
outputting read data that was received during a read operation from an SPI slave device with the clock signals that were phase shifted; and
determining a delay associated with the slave device when the slave device transmits a known pattern of read data to the SPI controller; and
assigning the delay offset for the slave device based on the delay determined.

9. The method of claim 8, comprising tuning the delay based on a condition.

10. The method of claim 8, further comprising receiving read data from a plurality of SPI slave devices during a plurality of read operations, wherein the condition associated with reading is an identification of the slave device from which the read data is received during the read operation.

11. The method of claim 8, wherein the condition is an environmental condition.

12. The method of claim 8, further comprising:
measuring a delay associated with read data that was read from the slave device; and
determining the phase offset for the slave device based on the delay measured.

13. The method according to claim 8, further comprising:
coupling the SM controller to a plurality of SPI slave devices;
storing indexes that identify the respective SPI slave devices; and
storing a delay offset associated with each index, the delay offset being configured for the associated SPI slave device.

14. The SPI controller according to claim 1, wherein the delay offset is based on an inherent delay of transmission of the read data.

15. The method of claim 8, wherein the delay offset is based on an inherent delay of transmission of the read data.

* * * * *